(12) United States Patent
Richards

(10) Patent No.: X6469
(45) Date of Patent: Apr. 11, 1831

(54) CAOUTCHOUC, FLUID, TO RENDER ARTICLES WATERPROOF

(76) Inventor: George H. Richards

George. H. Richards
Letters Patent.

The Schedule referred to in these Letters Patent and making part of the
same containing a description in the words of the said George H. Richards
himself of his improvement in the mode of rendering a variety of articles
Water Proof by means of fluid Caoutchouc and of otherwise using
that substance so as to produce new and valuable results.

To all whom it may concern. Be it known that I George H. Richards
have discovered a new and useful mode, or new and useful modes of render-
ing a variety of articles water proof by means of fluid Caoutchouc, and
of otherwise using that substance so as to produce new and valuable results;
and that the following is a full and exact description of my said inven-
tion or discovery — It is well known that the substance ^commonly called gum
elastic or india rubber but more correctly Caoutchouc is produced by the
dissication of the sap or juice of several plants and trees, and particu-
larly of Havia Caoutchouc and Jatropha Elastica, growing in the South-
ern part of this Continent and from the Urcela Elastica of Asia.
This substance in the fluid form has never been applied to the purpo-
ses of manufacturing or preparing of many things to which it is peculiarly applica-
ble altho' bottles, boots, shoes, balls, and sheets have been formed thereof in
the places where the above named and similar plants grow. It is true that
for the purposes of philosophical experiment small portions of the juice have
been taken to Europe and brought to this Country but it has never been ad-
vantageously employed for the purposes of utility until it was done by me.
Solutions of the indurated substance as usually imported have been made
in ether naphtha oil of sassafras spirits of turpentine spirits of
Coal tar and other liquids and a varnish has been thus made which has
been occasionally applied to useful purposes, and so far as thus applied, the
solution is thus excepted from my use and application of Caoutchouc.
My application of Caoutchouc consists principally in the application of
it from its original fluid state and I use it either substantively, that is to dry by itself alone, or I employ it in connexion with other substances, as a cement, or as a varnish, or a covering, or impregnation, or saturation, or stiffening. By its use I render the object to which it is applied either elastic or more durable, or waterproof, or airtight according to their natures and the purposes to which they are to be applied.

When used as a cement or varnish, I sometimes employ it alone but generally mix it with glue, pitch, tar, copal, or other adhesive or brightening articles, it may be employed either in a cold or warm state, though the warm may generally be considered preferable.

Without attempting to enumerate or specify the various objects or substances to which I mean to apply the fluid caoutchouc I will mention a few of them. I apply to cloth of every kind, to ropes, cordage, strings — to all articles manufactured from fibrous materials — to the products or fabrics generally, of wood, leather, metals, and minerals, cotton hemp, flax, wool silk &c. to cover, or saturate leather wood or other porous substances, to varnish metals to preserve them from oxydation. For these and other objects I sometimes mix with fluid caoutchouc the earths, metallic oxides and carbonaceous substances, either simply or in combination, but generally in a state of minute division: and I thus produce a variety of compound substances, having almost any degree of hardness, possessing many properties of caoutchouc, or combining ornament with utility, according to the nature and objects of the mixture. The action of atmospheric air and of solar heat is sufficient to convert the fluid into a solid substance, but it may sometimes be expedient to facilitate the process by artificial heat. The caoutchouc or its compounds may be applied by dipping the article to be covered or saturated, into it, or a brush may be used in the manner of varnishing. No particular directions are necessary on this point as everything must depend upon the nature of the substance upon which the operation is performed. I claim as original the useful application of the native fluid caoutchouc, as set forth in this specification, either alone, or in combination, when employed for the purposes, or in the manner herein before set forth.

Witnesses
Jno. Chalmers
Solomon Hubbard

George H. Richards.

( [illegible] ) ( [illegible] )